US011775710B1

(12) United States Patent
Sayettat ep. Beley et al.

(10) Patent No.: US 11,775,710 B1
(45) Date of Patent: Oct. 3, 2023

(54) METHODS AND SYSTEMS FOR SIMULATING MULTISTAGE CYCLIC SYMMETRY ASSEMBLIES

(71) Applicant: ANSYS, Inc., Canonsburg, PA (US)

(72) Inventors: Aline Françoise Sayettat ep. Beley, Caluire et Cuire (FR); Andrew Christopher Madden, Ann Arbor, MI (US); Emmanuel Cottanceau, Lyons (FR)

(73) Assignee: Ansys, Inc., Canonsburg, PA (US)

( * ) Notice: Subject to any disclaimer, the term of this patent is extended or adjusted under 35 U.S.C. 154(b) by 267 days.

(21) Appl. No.: 17/023,819

(22) Filed: Sep. 17, 2020

Related U.S. Application Data

(60) Provisional application No. 63/053,493, filed on Jul. 17, 2020, provisional application No. 63/052,055, filed on Jul. 15, 2020.

(51) Int. Cl.
*G06F 30/23* (2020.01)
*G06F 30/10* (2020.01)
(Continued)

(52) U.S. Cl.
CPC .............. *G06F 30/23* (2020.01); *G06F 30/10* (2020.01); *G06F 30/25* (2020.01); *G06F 30/367* (2020.01);
(Continued)

(58) Field of Classification Search
CPC ...... G06F 30/23; G06F 30/10; G06F 2111/04; G06F 2111/10; G06F 30/25;
(Continued)

(56) References Cited

U.S. PATENT DOCUMENTS

| 8,970,590 | B1 * | 3/2015 | Brennan | G06T 17/20 |
| | | | | 345/581 |
| 2006/0173658 | A1 * | 8/2006 | Korsmeyer | G06F 30/17 |
| | | | | 703/2 |

(Continued)

OTHER PUBLICATIONS

D. Laxalde, F. Thouverez, P. Lombard, "Dynamic analysis of multi-stage cyclic structures", ScienceDirect, total pgs of 6 (Year: 2007).*

(Continued)

*Primary Examiner* — Kibrom K Gebresilassie

(57) ABSTRACT

Data characterizing an assembly/structure containing a first stage and a second stage are received in a computer system. The first stage can contain a first cyclic symmetry and the second stage can contain a second cyclic symmetry. The first cyclic symmetry and the second cyclic symmetry are different from each other. Each stage may be a 360-degree stage. The received data includes a first mesh representing the first stage and a second mesh representing the second stage. Multiple simulation results are obtained using corresponding models in respective dynamic analyses of the assembly. Each model includes a set of constraints for coupling the first mesh and the second mesh. The set of constraints is associated with a group of distinct linked harmonic indices. Physical behaviors of the assembly are then calculated using one or more sets of the simulation results. Constraints are in forms of constraint equations.

21 Claims, 18 Drawing Sheets

(51) Int. Cl.
  *G06F 111/10* (2020.01)
  *G06F 111/04* (2020.01)
  *G06F 30/25* (2020.01)
  *G06F 111/00* (2020.01)
  *G06F 30/367* (2020.01)
  *G06F 119/22* (2020.01)
  *G06F 30/398* (2020.01)

(52) U.S. Cl.
  CPC ........ *G06F 30/398* (2020.01); *G06F 2111/00* (2020.01); *G06F 2111/04* (2020.01); *G06F 2111/10* (2020.01); *G06F 2119/22* (2020.01)

(58) Field of Classification Search
  CPC .. G06F 30/367; G06F 30/398; G06F 2111/00; G06F 2119/22
  See application file for complete search history.

(56) References Cited

U.S. PATENT DOCUMENTS

| | | | | |
|---|---|---|---|---|
| 2015/0308936 | A1* | 10/2015 | Huang | G06F 30/23 703/1 |
| 2018/0365357 | A1* | 12/2018 | James | G06F 30/23 |
| 2020/0217218 | A1* | 7/2020 | Tan | F02C 9/00 |
| 2022/0180978 | A1* | 6/2022 | Burnham | G06F 30/20 |

OTHER PUBLICATIONS

G Battiato, C.M. Firrone, T. m. Berruti, B. I. Epureanu, "Reduced order modeling for multi-stage coupling of cyclic symmetric structures", pp. 3447-3462, (Year: 2016).*

H. Murakami, Y. Nishimura, "Initial Shape finding an modal analyses of cyclic right cylindrical tensegrity modules", pp. 891-916, Elsevier (Year: 2001).*

D. Laxalde, F. Thouverez, P. Lombard, "Dynamic analysis of multi-stage cyclic structures", ScienceDirect2007 (Year: 2007).*

G Battiato, C.M. Firrone, T. m. Berruti, B. I. Epureanu (Herein referred as Battiato et al), "Reduced order modeling for multi-stage coupling of cyclic symmetric structures", pp. 3447-3462, 2016 (Year: 2016).*

B. Dong, "Modal Analysis of General Cyclically Symmetric Systems with Applications to Multi-Stage Structures" pp. 1-228, 2019 (Year: 2019).*

Denis Laxalde et al., "Dynamics of Multi-Stage Bladed Disks Systems", Proceedings of GT2007, ASME Turbo Expo 2007: Power for Land, Sea and Air, Montreal, Canada, dated May 14-17, 2007, total 8 pages.

Duc-Minh Tran, "Reduced models of multi-stage cyclic structures using cyclic symmetry reduction and component mode synthesis", Journal of Sound and Vibration, journal homepage: www.elsevier.com/locate/jsvi, dated Jun. 4, 2014, p. 5443 to p. 5464, total 22 pages.

Arnaud Sternchüss et al., "Reduction of Multistage Disk Models: Application to an Industrial Rotor", Downloaded Dec. 10, 2009 to 141.212.126.116. Redistribution subject to ASME license or copyright; see http://www.asme.org/terms/Terms_Use.cfm, vol. 131/012502-1, dated Jan. 2009, total 14 pages.

N.C.Kill et al., "Extension of the multi-stage cyclic symmetry methodology and application to modal and dynamic response analyses", Proceedings of ISMA2018 and USD2018, p. 1801 to p. 1808, dated 2008, total 8 pages.

* cited by examiner

METHODS AND SYSTEMS FOR SIMULATING MULTISTAGE CYCLIC SYMMETRY ASSEMBLIES

CROSS-REFERENCE TO RELATED APPLICATIONS

This application claims benefits of U.S. Provisional Patent Application Ser. No. 63/052,055 for "Method And System For Simulating Multistage Cyclic Symmetry Systems", filed Jul. 15, 2020, and U.S. Provisional Patent Application Ser. No. 63/053,493 for "Method And System For Simulating Multistage Cyclic Symmetry Systems", filed Jul. 17, 2020. The contents of which are hereby incorporated by reference in its entirety for all purposes.

FIELD

The subject matter described herein relates to computer-aided engineering analysis (CAE), more particularly to methods and systems for simulating multistage cyclic symmetry assemblies.

BACKGROUND

Rotationally periodic structures are used in many engineering applications such as turbomachinery or gear wheels. Physical behaviors of such structures can be analyzed using cyclic symmetry reduction techniques. When an assembly contains more than one stage, it is referred to as multistage assembly. The term "multistage" comes from the combination of multiple turbomachinery stages. However, in this disclosure, it is not limited to turbomachinery. A stage refers to a distinct cyclically symmetric structure or assembly. Multistage assembly can contain two or more cyclically symmetric stages. Obtaining the static and/or dynamic structural responses of such a multistage assembly is important to accurately predict the physical behaviors and life of the assembly. Prior art approaches have been inefficient and cumbersome, for example, based on full non-cyclic solutions.

SUMMARY

In one aspect, data characterizing an assembly/structure containing a first stage and a second stage are received in a computer system. The first stage can contain a first cyclic symmetry and the second stage can contain a second cyclic symmetry. The first cyclic symmetry and the second cyclic symmetry are different from each other. A stage may be formed by multiple cyclically symmetric structures, each corresponding to a cyclic symmetry of the stage. Each stage may be a 360-degree stage. The received data includes a first mesh representing the first stage and a second mesh representing the second stage. Multiple simulation results of the assembly are obtained using corresponding models in respective simulations (e.g., dynamic analyses). Each model includes a set of constraints for coupling the first mesh and the second mesh. The set of constraints is associated with a group of linked harmonic indices. Physical behaviors of the assembly are then calculated using one or more sets of the simulation results.

In another aspect, the stages can be radially stacked or axially stacked. Each mesh can include a reference sector of the corresponding stage. Reference sector can be located at a starting circumferential location arbitrarily chosen. Mapping two meshes at an interstage boundary is achieved by rolling out sector mesh to a 360-degree rollout model. The set of constraints includes cyclic constraints and interstage constraints. Constraints used herein are in forms of constraint equations.

In yet another aspect, each group of linked harmonic indices includes a fundamental harmonic index for each stage. Each stage may further include one or more secondary harmonic indices. Each set of simulation results is obtained in a dynamic analysis.

In still another aspect, a prestress analysis model of the assembly is created for conducting an optional prestress analysis (e.g., nonlinear static analysis) before performing the dynamic analyses. The prestress model includes the set of constraints corresponding to harmonic indices set to zero for all stages. Physical characteristic properties of the assembly are updated based on initial physical behaviors obtained using the prestress analysis model under a preload condition (e.g., inertia load, pressure, thermal load).

Non-transitory computer-readable medium (i.e., physically embodied computer program products) is described that stores instructions, which when executed by one or more data processors of one or more computing systems, cause at least one data processor to perform operations herein. Similarly, computer systems are described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

The details of one or more variations of the subject matter described herein are set forth in the accompanying drawings and the description below. Other features and advantages of the subject matter described herein will be apparent from the description and drawings, and from the claims.

DETAILED DESCRIPTION

Multistage cyclic symmetry analyses provide a way of combining two or more independent cyclically symmetry systems with different sector counts while still making use of the efficiency of the cyclic symmetry procedure. Multistage cyclic symmetry can be useful when parts of a physical system/assembly/structure are cyclically symmetric. Systems such as a turbomachinery compressor where there are cyclically symmetric stators and blade rows having different sector counts can be modeled. Within each axially stacked stage, there may be multiple radially stacked stages to account for bolt patterns, stress relief holes, blades, etc.

Figure 1A:
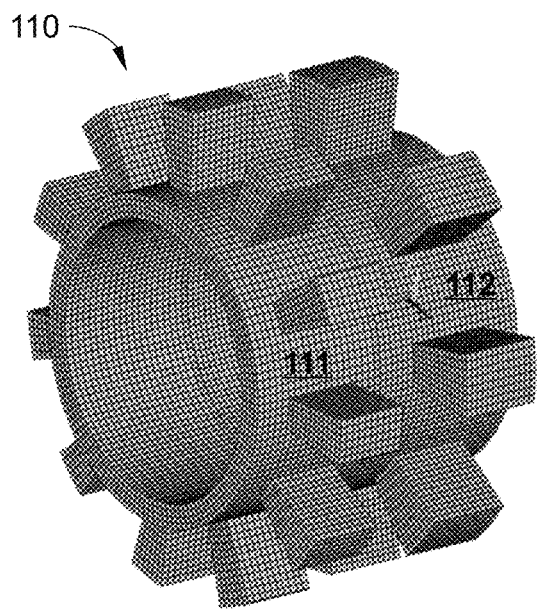
FIG. 1A is a diagram illustrating an example assembly having two different cyclically symmetric stages axially stacked.
Figure 1B:
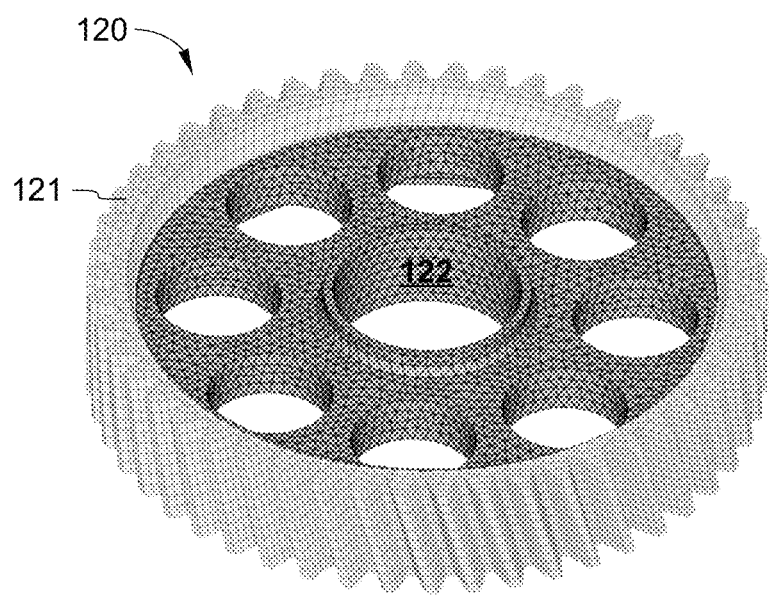
FIG. 1B is a diagram illustrating an example assembly having two different cyclically symmetric stages radially stacked.

Example multistage cyclic symmetry assemblies are shown in FIGS. 1A-1B. The first example assembly 110 contains two axially stacked stages: front stage 111 and rear stage 112. The front stage 111 and the rear stage 112 are different and each contains distinct cyclic symmetry. The second assembly 120 contains two radially stacked stages: outer stage 121 and inner stage 122 each has cyclic symmetry that is different from each other.

Figure 2A:
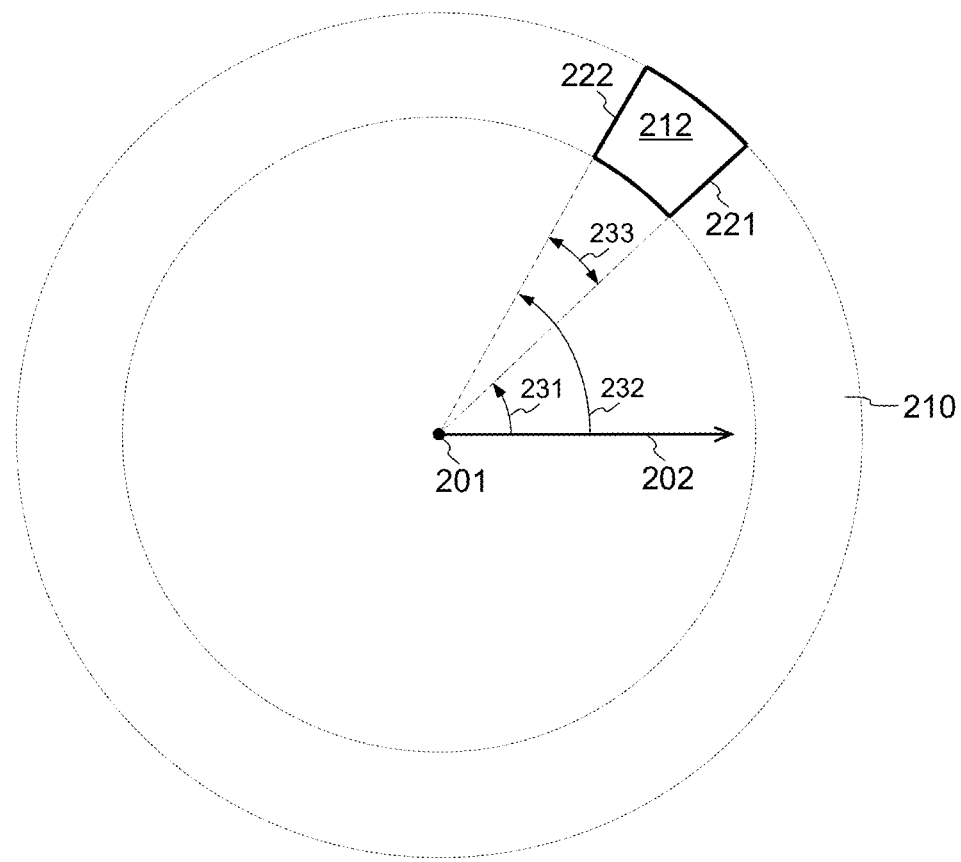
FIG. 2A is a two-dimensional view showing a reference sector of an example stage.

FIG. 2A is a two-dimensional view depicting an example cyclic symmetry stage 210 that contains a reference sector 212 with cyclic sector edges (i.e., cyclic low-edge 221, cyclic high-edge 222) perpendicular to the two-dimensional view for illustration simplicity and clarity. Reference sector can have other types of cyclic sector edges, for example, curved, slanted, non-planar cyclic sector edges. The cyclic symmetry stage 210 can be formed by replicating a reference sector 212 N times, where N is a positive integer. The reference sector 212 has a cyclic low-edge 221 and a cyclic high-edge 222. In a cyclic symmetry coordinate system (i.e., a polar coordinate system having a pole origin 201 and a polar axis 202), a low angle 231 and a high angle 232 represent respective circumferential locations of the cyclic low-edge 221 and the cyclic high-edge 222. Reference sector can also be referred to as base sector.

In the example shown in FIG. 2A, sector angle 233 of the reference sector 212 is the difference between the high angle 232 and the lower angle 231. For example, a reference sector with a 60-degree sector angle is replicated 6 times to form a 360-degree stage. In the example assemblies shown in FIGS. 1A-1B, the front stage 111 is formed by replicating a reference sector 11 times as there are 11 identical teeth. The outer stage 121 can be formed by replicating a reference sector 50 times, while the inner stage 122 can be formed by replicating a reference sector 8 times. Sector angle can be determined in different manners, for example, a user input that is further verified with angle calculations (e.g., angle calculated using each node pair on the cyclic low-edge and cyclic high-edge, respectively).

Figure 2B:
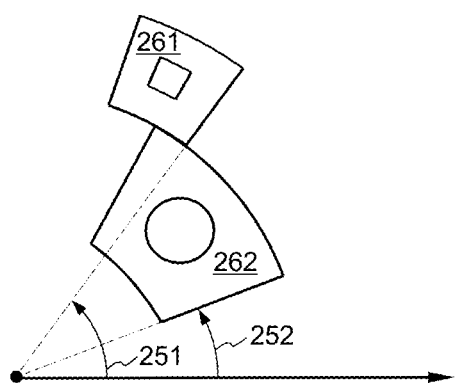
FIG. 2B is a two-dimensional view showing two example stages respectively represented by two reference sectors.

Two radially stacked stages respectively represented by two reference sectors 261-262 are shown in FIG. 2B. In a cyclic symmetry coordinate system, the starting circumferential locations of the reference sectors 261-262 are respectively indicated with different polar angles 251-252. Reference sectors 261-262 can be located at different starting circumferential locations with an overlap as shown in FIG. 2B. However, reference sectors may not have any overlap at all. Further, reference sectors can be aligned at the same starting circumferential location. In other words, each of the reference sectors 261-262 is arbitrarily located.

Figure 3:
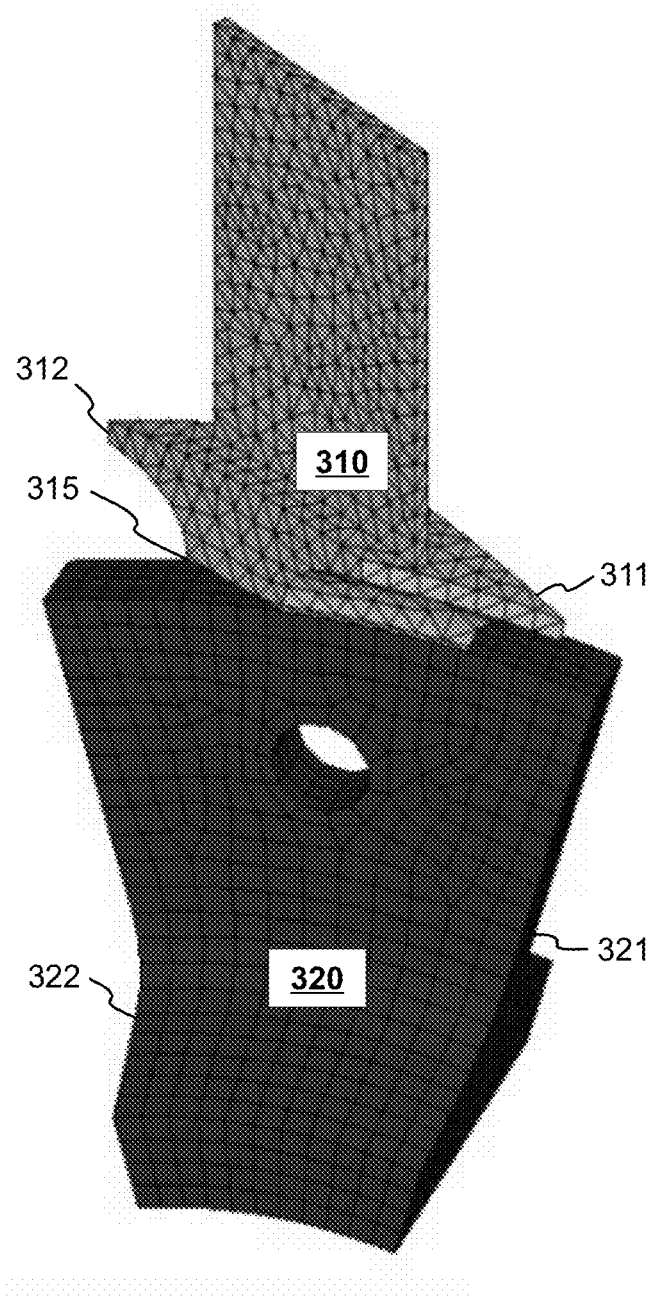
FIG. 3 is a diagram showing two example radially stacked sector meshes.

To further demonstrate radially stacked stages with different edge geometries in a multistage cyclic symmetry assembly, FIG. 3 depicts two mesh models or meshes. The first mesh 310 represents the outer stage having an outer stage cyclic low-edge 311 and an outer stage cyclic high-edge 312. The second mesh 320 has an inner stage cyclic low-edge 321 and inner stage cyclic high-edge 322 for representing the inner stage. The sector edges 311-312 of the first mesh 310 and the sector edges 321-322 of the second mesh 320 have different orientations. In other words, sectors in two stages may contain complex edge geometries. Due the complex edge geometry, sector angle is calculated based on a pair of matched high/low edge nodes. An interstage boundary 315 is located between the first mesh 310 and the second mesh 320. Mesh model comprises a finite element analysis model. For example, as shown in FIG. 3, the first mesh 310 contains tetrahedral finite elements and the second mesh 320 contains hexahedral finite elements.

Figure 4:
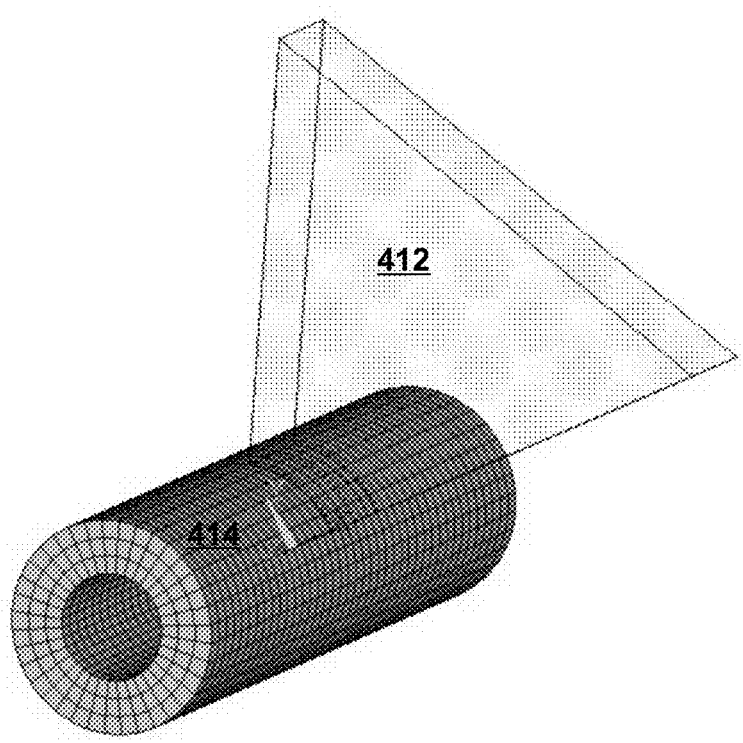
FIG. 4 is a diagram showing a first example mesh containing a reference sector of a first stage and a second example mesh containing a 360-degree structure of a second stage.

FIG. 4 shows alternative meshes representing two stages in a multistage cyclic symmetry assembly. The alternative meshes include a 360-degree mesh 414 represents the entire structure of the inner stage while a sector mesh 412 represents the outer stage.

Figure 5:
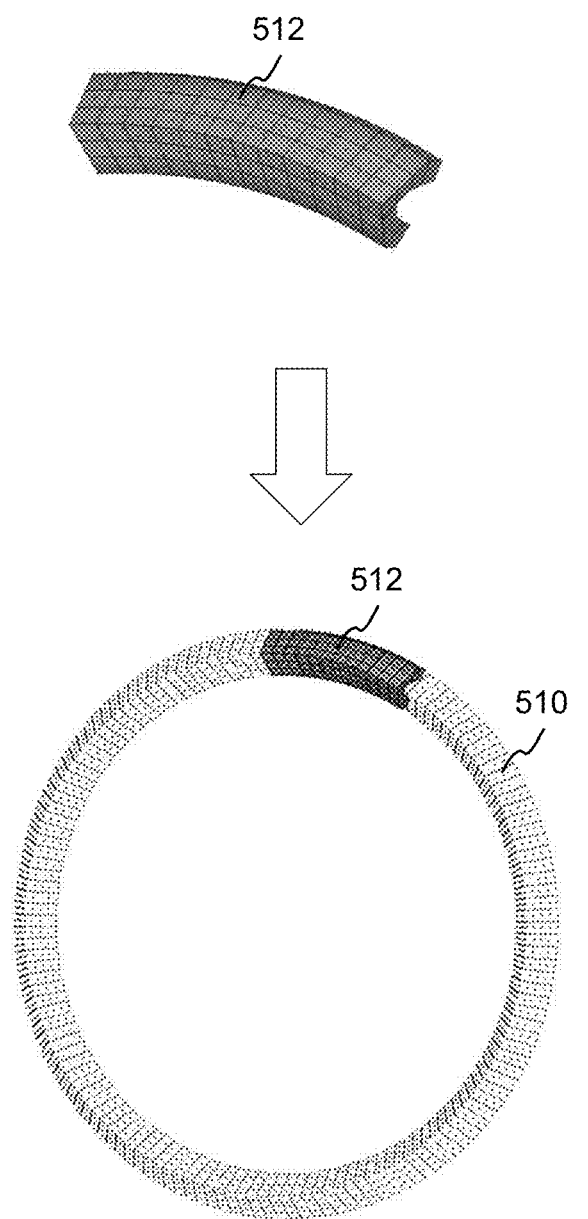
FIG. 5 is a diagram illustrating an example sector mesh and a rollout model created therefrom.

In order to conduct simulation of a multistage assembly, meshes representing two adjacent stages need to be coupled or joined. When meshes are non-conformal (i.e., mismatched at the interstage boundary), mapping two non-conformal sector meshes needs to be performed. Using a scheme of rolling out a sector mesh to a 360-degree rollout model can resolve the difficulties due to convoluted nature caused by sector replications. Mapping relationship can then be performed between two 360-degree models. FIG. 5 is a schematic diagram illustrating rolling out an example sector mesh 512 to form a 360-degree model 510 (i.e., a rollout model). An example scheme includes rolling out the nodes of one stage and then marching one by one for each of the sectors to expand the elements of the other stage.

Figure 6A:
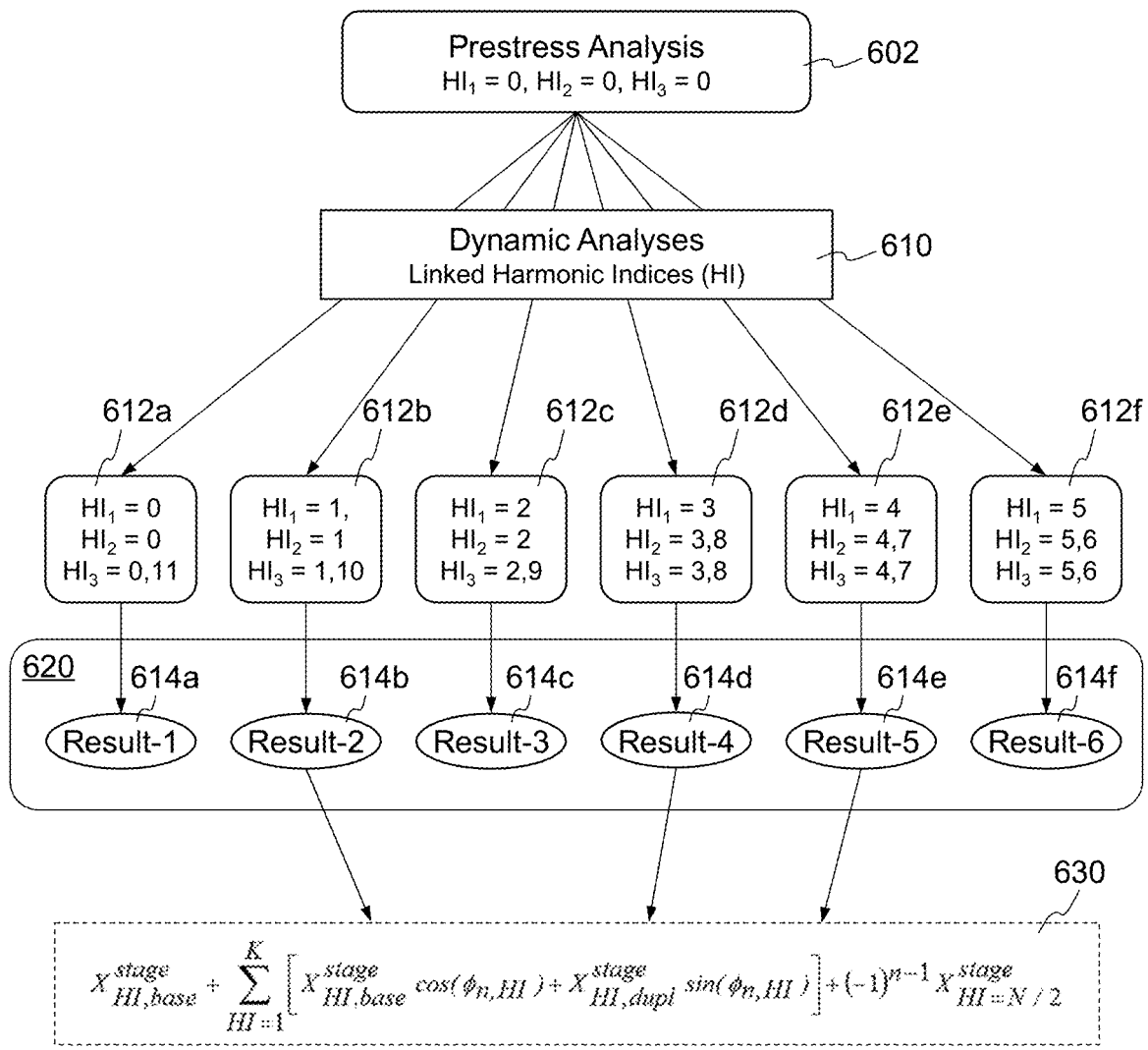
FIG. 6A is a schematic diagram illustrating a simulation workflow of an example multistage cyclic symmetric assembly.

FIG. 6A is a schematic diagram illustrating an example simulation workflow of a multistage cyclic symmetric assembly. To better understand the workflow, a brief introduction of multistage cyclic symmetry equations is listed as follows:

Harmonic Response Equation $$(-\omega^2[M]+j\omega[C]+[K])\{u\}=f$$

where:
M is mass,
C is damping,
K is stiffness,
$\omega$ is circular frequency,
u is displacement degrees of freedom, and
$f$ is harmonic loading.

It is noted that multistage cyclic symmetry can also be applied a number of different analyses, including but not limited to, static, buckling, transient, modal, linear perturbation, modal superposition analyses.

Stage Equation

For simplicity, a two-stage example is used to demonstrate the harmonic equations, but this can be generalized to more than two stages. Prior to applying compatibility at the interstage boundaries, system equations for two stages have:

$$\{u\} = \begin{Bmatrix} \{u^1\} \\ - \\ \{u^2\} \end{Bmatrix}, [K] = \begin{bmatrix} [K^1] & 0 \\ 0 & [K^2] \end{bmatrix}, \text{ and } \{f\} = \begin{Bmatrix} \{f^1\} \\ - \\ \{f^2\} \end{Bmatrix}$$

where superscripts denote the respective stage numbers (i.e., stage 1 or 2). The above system equations are equivalent to having two separate bodies that are not attached to each other. Although only stiffness K is listed above, the treatment is the same for the mass M and the damping C.

Cyclic Transformation

For each stage, the real-valued Fourier matrix is applied to transform the system into cyclic symmetry space, which decouples the system into harmonic index blocks:

$$\begin{Bmatrix} \{u^1\} \\ - \\ \{u^2\} \end{Bmatrix} = \begin{bmatrix} [T^1] & 0 \\ 0 & [T^2] \end{bmatrix} \begin{Bmatrix} \{\bar{u}^1\} \\ - \\ \{\bar{u}^2\} \end{Bmatrix}$$

$$[\bar{K}^1] = \begin{bmatrix} [T^1]^T[K^1][T^1] & 0 \\ 0 & [T^2]^T[K^2][T^2] \end{bmatrix}$$

$$\{\bar{f}\} = \begin{bmatrix} [T^1] & 0 \\ 0 & [T^2] \end{bmatrix} \begin{Bmatrix} \{f^1\} \\ - \\ \{f^2\} \end{Bmatrix} = \begin{Bmatrix} [T^1]^T\{\bar{f}^1\} \\ - \\ [T^2]^T\{\bar{f}^2\} \end{Bmatrix}$$

Note that the $[T^i]=[T^i]\otimes[I]$ represents the Kronecker product of the real-valued Fourier matrix with an identity matrix [I] having a size of the number of degrees-of-freedom (DOF) of a single sector. At this point, it is possible to look at one or more harmonic index block of each stage to consider as needed.

Coupling and Cyclic Constraint Equations

Cyclic symmetry compatibility conditions are enforced for each harmonic index solution via coupling and/or constraint equations (CEs) connecting the nodes on the low- and high-edge components on the base and duplicate sectors. Cyclic constraint equations for edge-component nodes have the form as follows:

$$\begin{Bmatrix} U^A_{High} \\ U^B_{High} \end{Bmatrix} = \begin{bmatrix} \cos k\alpha & -\sin k\alpha \\ \sin k\alpha & \cos k\alpha \end{bmatrix} \begin{Bmatrix} U^A_{Low} \\ U^B_{Low} \end{Bmatrix}$$

where:
k represents Harmonic Index (0, 1, 2, . . . , N/2) when N is even, (0, 1, 2, . . . , (N−1)/2) when N is odd.
N is an integer representing the number of sectors in 360-degree or $2\pi$.
$\alpha$ represents sector angle ($2\pi/N$).
U represents a vector of displacement and rotational DOF.
$U_{Low}^A$ represents the base sector low side edge.
$U_{High}^A$ represents the base sector high side edge.
$U_{Low}^B$ represents the duplicate sector low side edge.
$U_{High}^B$ represents the duplicate sector high side edge.

Interstage Constraint Equations

The physical stage degrees of freedom, $u^1$ and $u^2$, can be split into internal and boundary degrees of freedom. The coupling between the stages occurs on the boundary degrees of freedom, $u_b^1$ and $u_b^2$. In order to ensure compatibility in the physical domain, the boundary degrees of freedom between the stages are enforced to be equal:

$$\{u_b^1\}=\{u_b^2\}$$

where the subscript b denotes the boundary. If the boundary degrees of freedom in the physical domain are not aligned, there will be a mapping matrix applied to relate interstage boundary degrees of freedom. These boundary degrees of freedom are approximated using the real-valued Fourier coefficients of the base associated with the number of sectors of the respective cyclic stages $$\{u_b^1\} \approx \sum_k [T^1_{i,k}]\{\bar{u}^1_{b,k}\}$$

$$\{u_b^2\} \approx \sum_k [T^2_{i,l}]\{\bar{u}^2_{b,l}\}$$

where k and l represent the harmonic index of interest for each stage to be coupled. In practice, at least one multistage cyclic set of equation with k=1 will be required. The constraint equation now only contains cyclic quantities and can be applied to our multistage cyclic system:

$$\sum_k [T^1_{i,k}]\{\bar{u}^1_{b,k}\} = \sum_k [T^2_{i,l}]\{\bar{u}^2_{b,l}\}$$

Harmonic Index and Nodal Diameter

To understand the process involved in a modal cyclic symmetry analysis, it is necessary to understand the concepts of harmonic indices and nodal diameters. The nodal diameter refers to the appearance of a simple geometry (for example, a disk) vibrating in a certain mode. Most mode shapes contain lines of zero out-of-plane displacement which cross the entire disk.

The harmonic index is an integer that determines the variation in the value of a single degree of freedom at points spaced at a circumferential angle equal to the sector angle. The nodal diameter is the same as the harmonic index in only some cases. The solution of a given harmonic index may contain modes of more than one nodal diameter. The following equation represents the relationship between the harmonic index k and nodal diameter d for a model consisting of N sectors:

$$d = m \times N \mp k$$

where m=0, 1, 2, . . . , ∞.

Linked Harmonic Indices

In a multistage cyclic symmetry assembly, a group of linked harmonic indices includes one or more harmonic indices for each stage. A linked harmonic index (HI) system is a set of coupled and relevant cyclic harmonic indices for a multistage model. For example, for a two-stage model, the set can be ($HI_1$=1 and $HI_2$=1,4) to simulate the system when both stages vibrate in harmonic index 1. Subscript for HI indicates the stage number.

Duplicate Sector

The architecture of the cyclic symmetry solution process depends upon how the compatibility and equilibrium conditions of the cyclic sector are enforced in the matrix-solution process. During a simulation, a duplicate sector of finite elements at the same geometric location as the base sector (i.e., reference sector defined by a mesh in the current disclosure) is generated. Duplicate sector creation can occur automatically and transparently in a computer program.

In the traditional cyclic symmetry problem where there is only a single cyclic structure, each mode shape of the system corresponds to a single harmonic index. Similarly, the response of a traditional cyclic symmetry system to a traveling wave load aligned with that harmonic index, will have a response that excites only that harmonic index. For a multistage cyclic symmetry system, there may be a harmonic index of interest for each mode or a single harmonic index driving the traveling wave load. A fundamental harmonic corresponds to the main circumferential harmonic index of interest of a multistage cyclic symmetry system. However, because the entire system is not truly a single cyclic symmetry structure, there may be additional harmonics that contribute to the response. Any additional harmonics beyond the fundamental harmonic used to model a multistage cyclic structure are called secondary harmonics. For example, one key reason secondary harmonic indices appear is due to aliasing of harmonic indices from stages having a greater number harmonic indices onto the harmonic indices of the stage with the lowest number of harmonic indices.

The simulation workflow starts by performing an optional prestress analysis 602. Prestress analysis can be a nonlinear static analysis of the multistage cyclic symmetry assembly based on a prestress model created in accordance with harmonic indices of all stages set to 0 (e.g., $HI_1$=0, $HI_2$=0, $HI_3$=0 for a 3-stage assembly). Next, a number of dynamic analyses are performed at 610. Each dynamic analysis is performed based on a dynamic analysis model associated with a group of linked harmonic indices.

A three-stage assembly having 11 sectors in the first stage, 16 sectors in the second stage, and 22 sectors in the third stage is used in FIG. 6A. A group of linked harmonic indices includes a fundamental harmonic index, and optionally one or more secondary harmonic indices for each stage. Six groups of linked harmonic indices 612a-612f are chosen. In one example, the first group 612a contains $HI_1$=0, $HI_2$=0, and $HI_3$=0,11. The first and second stages include only a fundamental HI at 0. The third stage includes a fundamental HI at 0 and a secondary HI at 11.

In another example, the fourth group 612d contains $HI_1$=3, $HI_2$=3,8 and $HI_3$=3,8. The first stage includes a fundamental HI at 3, while the second and third stages include a fundamental HI at 3 and a secondary HI at 8.

Simulation results 614a-614f are obtained using dynamic analysis models created according to six distinct groups of harmonic indices 612a-612f. The simulations may be distributed to be performed, i.e., each simulation may be performed independently. The simulation results can be stored in a database 620 for postprocessing, in which one or more of the simulation results can be combined. For example, formula 630 can be used for combining three simulation results (Result-2 614b, Result-4 614d, and Result-5 614e) to obtain simulated physical behaviors.

Figure 6B:
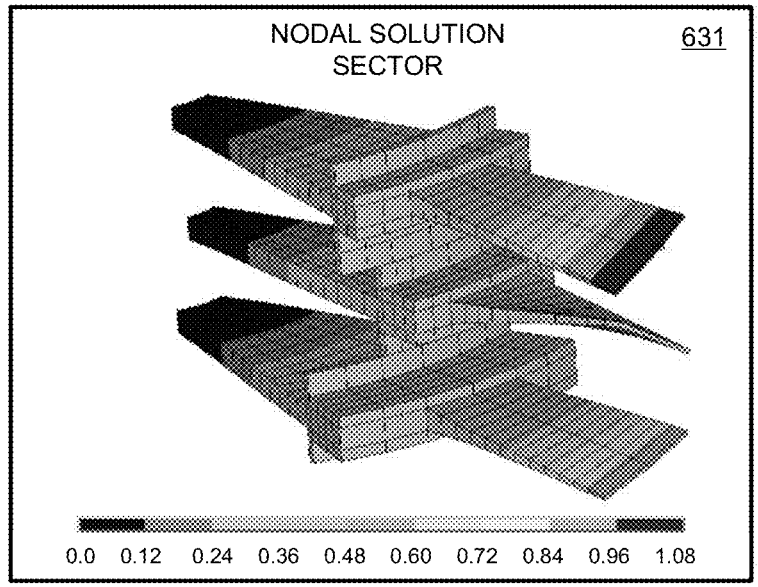
FIG. 6B is a diagram showing simulated physical behaviors of an example multistage cyclic symmetric assembly.
Figure 6B:
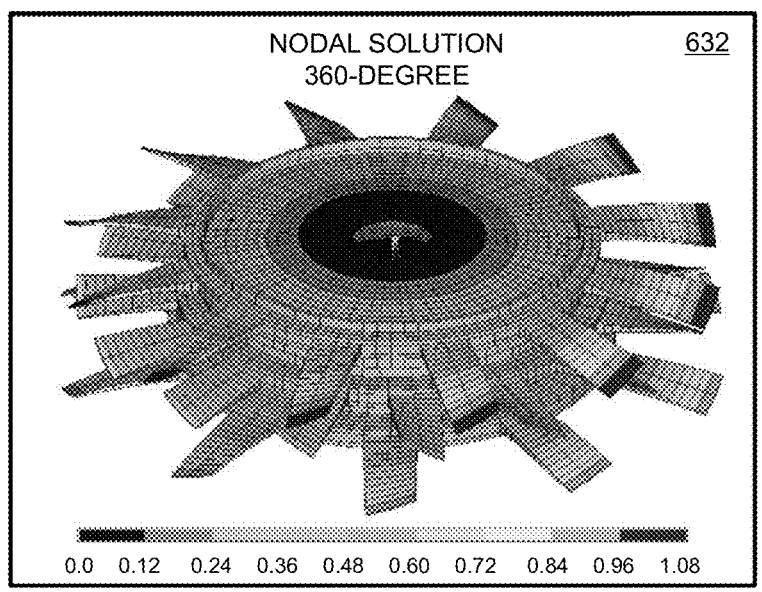

Simulated physical behaviors are shown as fringe plots in FIG. 6B. Nodal displacements of a reference sector are shown in diagram 631, which can be expanded to the nodal displacements of the entire assembly in diagram 632.

Figure 7A:
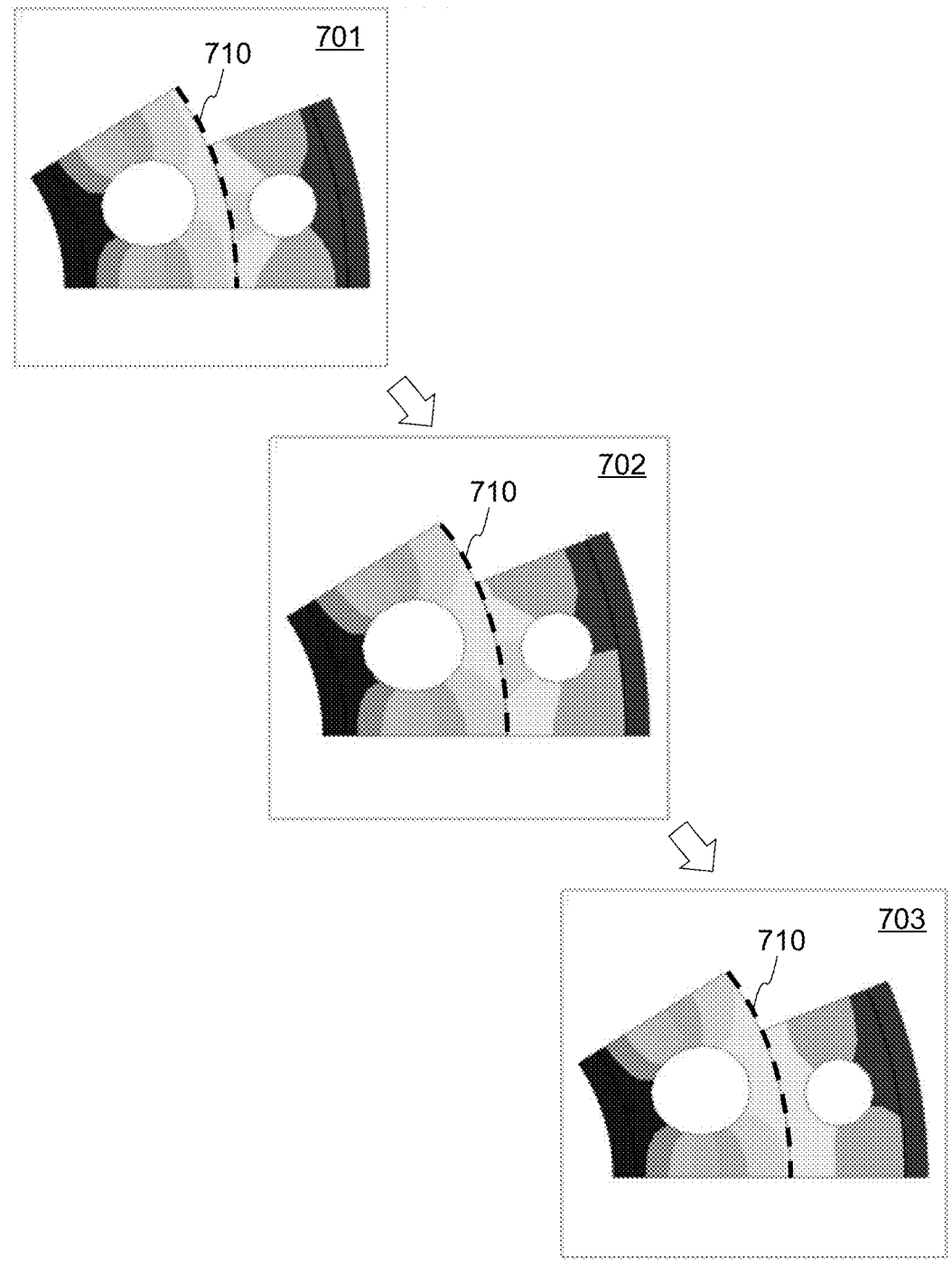
FIGS. 7A-7B are diagrams showing a comparison of simulated physical behaviors along an interstage boundary of an example multistage cyclic symmetric assembly.

FIG. 7A shows that improvements to the simulated physical behaviors of a multistage assembly can be viewed in a series of fringe plots 701-703 of deformation. A path 710 (i.e., an interstage boundary) between two stages can be defined, simulated physical behaviors at either side of the path 710 can be compared. In the first fringe plot 701, the deformations do not match along the path 710. The simulated physical behaviors have improved in the second fringe plot 702, and are very closely matched in the third fringe plot 703. The improvements can be achieved by different simulations, for example, combining different groups of linked harmonic indices. The comparison along the path 710 may be represented by a plot 750 of radial deformation versus polar angles shown in FIG. 7B.

Figure 8A:
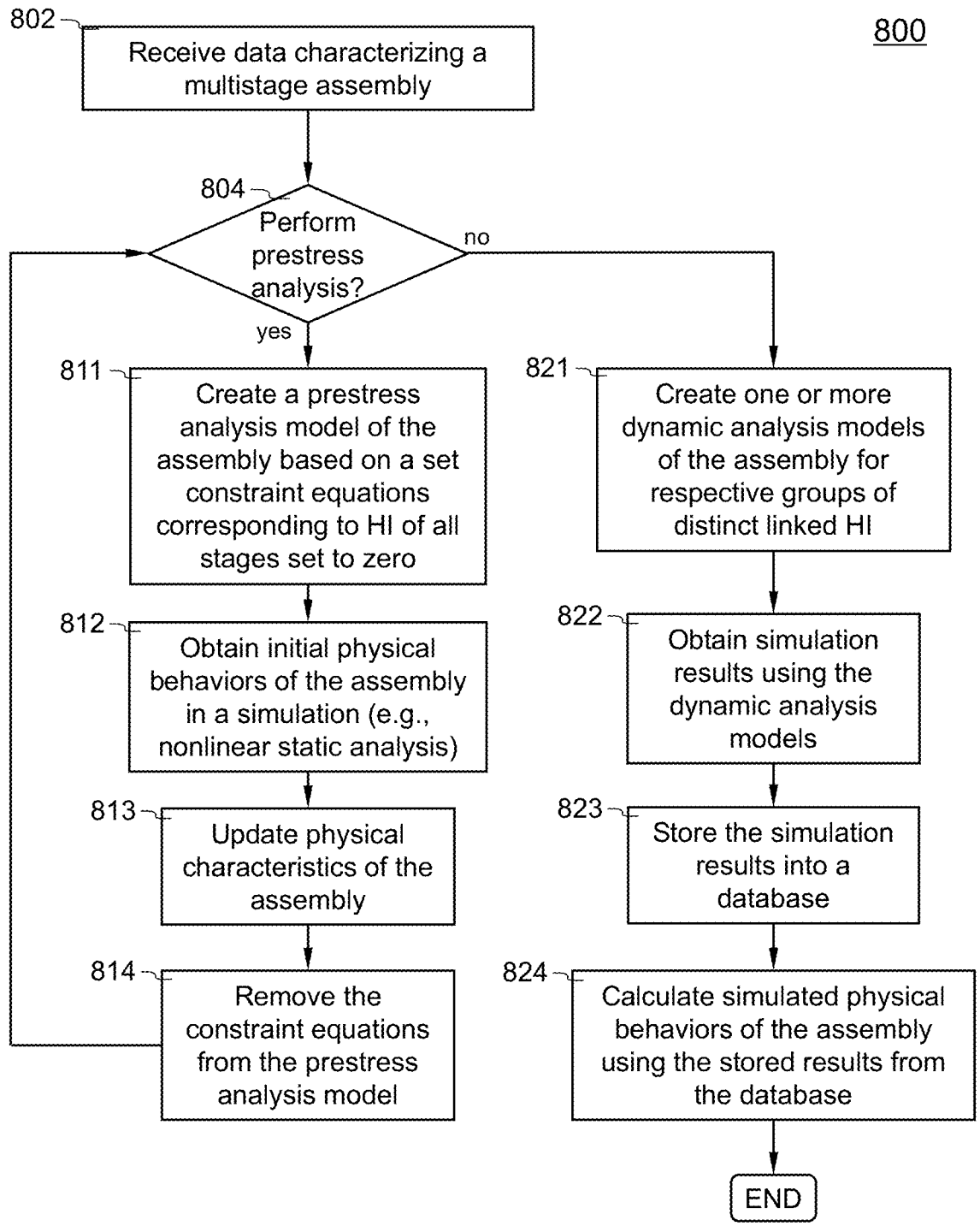
FIGS. 8A-8F are collectively a flowchart illustrating a simulation process of an example multistage cyclic symmetric assembly.

Referring now to FIGS. 8A-8F, a flowchart of conducting a simulation of a multistage assembly having more than one cyclic symmetry is shown in FIG. 8A. Process 800 starts at action 802 by receiving data characterizing an assembly (i.e., a multistage assembly or structure) containing a first stage and a second stage in a computer system (e.g., a computer system shown in FIGS. 9A-9B). The first stage contains a first cyclic symmetry and the second stage contains a second cyclic symmetry. The first cyclic symmetry and the second cyclic symmetry are different from each other. The received data includes a first mesh representing the first stage and a second mesh representing the second stage.

Next, at decision 804, it is determined whether a prestress analysis is performed. Prestress analysis can be a nonlinear static analysis of the assembly under a preload condition. If 'yes', process 800 moves to action 811, a prestress analysis model of the assembly is created from the received meshes based on a set of constraint equations corresponding to harmonic indices of all stages set to zero. At action 812, initial physical behaviors (e.g., deformation) of the assembly are obtained in a simulation (i.e., nonlinear static analysis). As a result of nodal deformations, physical characteristics (e.g., stiffness and mass) of the assembly can be then updated accordingly at action 813. Next, at action 814, the constraint equations are removed from the prestress analysis model such that the mesh models can be used for further simulations (e.g., dynamic analyses). When the prestress analysis is non-linear, the geometry is updated, and the constraint equations are defined on the new updated meshes. Dynamic analysis can be modal analysis, steady-state harmonic response analysis, transient analysis, etc.

If decision 804 is 'no', process 800 moves to action 821. One or more dynamic analysis models of the assembly are created. Each dynamic analysis model corresponds to a set of constraint equations based on a distinct group of linked harmonic indices 612a-612f in FIG. 6A. At action 822, simulated results are obtained based on the dynamic analysis models. Simulated results 614a-614f can then be stored in a database 620 for postprocessing at action 823. At action 824, simulated physical behaviors of the assembly can be calculated using one or more of the stored simulation results. For example, formula 630 in FIG. 6A may be used for calculating nodal displacements of an assembly. Various combinations of linked harmonic indices can be achieved.

Figure 8B:
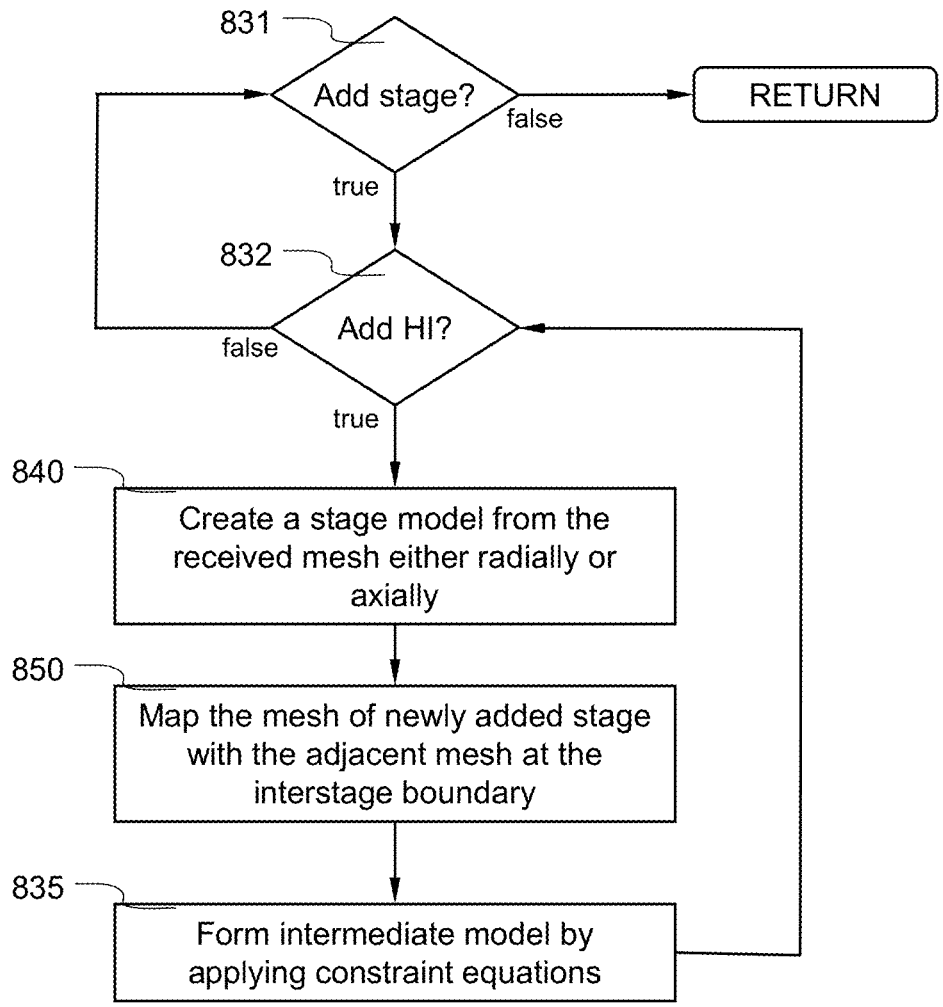

Details of action 811 or action 821 are shown in FIG. 8B. Process 830 can be used for creating a model (i.e., prestress model or dynamic model) representing a multistage assembly or structure. Process 830 starts at decision 831 to determine whether there is a stage to be added. If 'true', at decision 832, it is determined if there is a harmonic index to be added. If 'true, a stage model is created from the received mesh at action 840. The stage model can be either radially or axially added to an intermediate model if it existed. When the first stage is processed through process 830, there is no intermediate model. Next, at action 850, the mesh of newly added stage is mapped with the adjacent mesh at the interstage boundary. An intermediate model is formed/updated by applying constraint equations at action 835. When the first stage is added/created through process 830, an intermediate model is created. The intermediate model is updated as a subsequent stage is added. Then, process 830 moves back to decision 832. If there is additional harmonic index to be added, the received mesh is cloned for the additional harmonic index. Otherwise, process 830 moves back to decision 831. Process 830 is repeated if there is another stage to be added. The model creation is completed when there is no more stage (i.e., decision 831 becomes false).

Figure 8C:
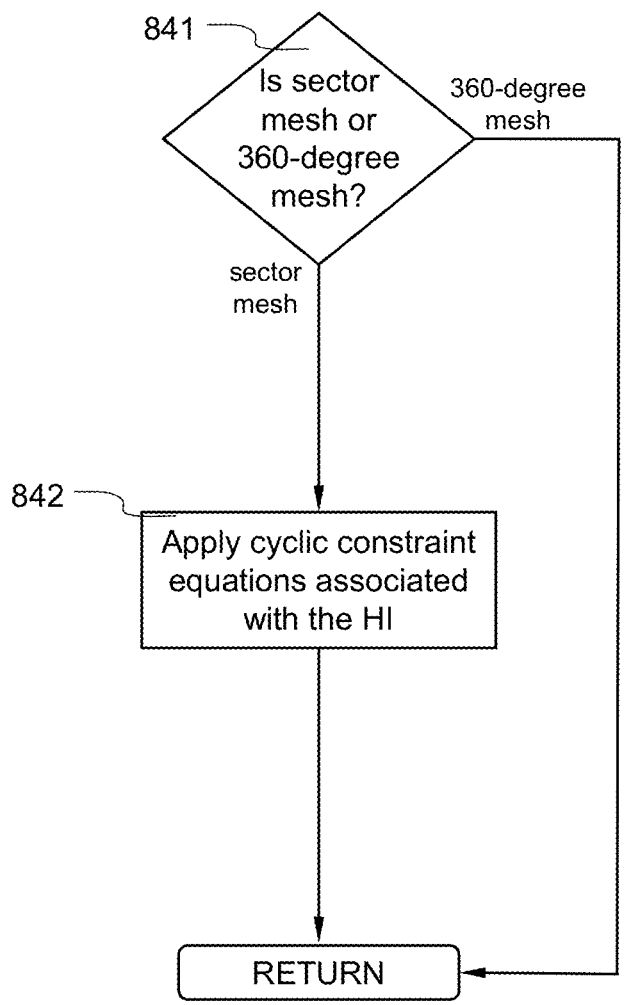

FIG. 8C shows details of action 840, which starts at decision 841 to determine whether the received mesh is a sector mesh or a 360-degree mesh. If the received mesh is a 360-degree mesh, the stage is completed without any further action. Otherwise at action 842 (i.e., sector mesh), cyclic constraint equations associated with the harmonic index are applied, which follows the 'true' path in decision 832 of FIG. 8B. The dynamic analysis model of the stage for the harmonic index is completed thereafter.

Figure 8D:
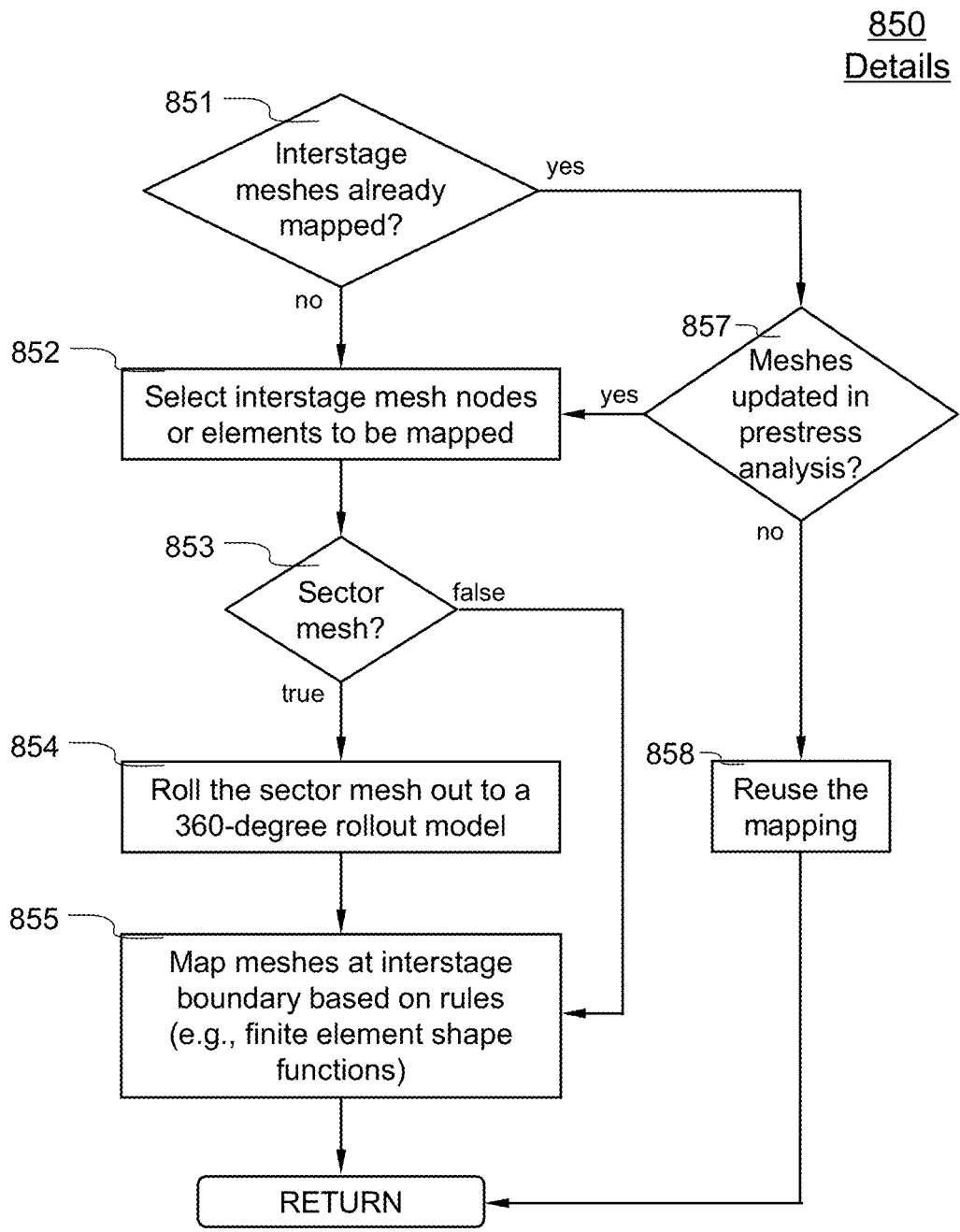

Details of action 850 are shown in FIG. 8D. Starting at decision 851, it is determined whether the meshes have mapped at the interstage boundary. If 'no', a set of nodes or elements at the interstage boundary to be mapped are selected at action 852. Next, at decision 853, it is determined if the mesh is a sector. If 'true', a 360-degree rollout model at the interstage boundary is created by rolling out nodes and mapping with the sector mesh (e.g., see FIG. 5) at action 854 before moving to action 855. Otherwise it follows the 'false' path directly to action 855. Meshes at the interstage boundary can be orderly mapped at action 855 according to a consistent scheme (e.g., based on finite element shape functions). The mapping between two meshes are completed thereafter. Referring back to decision 851, if 'yes', at decision 857, it is determined whether the meshes have been updated in a prestress analysis. If 'yes', the mapping needs to be updated through actions/decisions following action 852. Otherwise, at action 858, the mapping between two meshes are reused and completed thereafter.

Figure 8E:
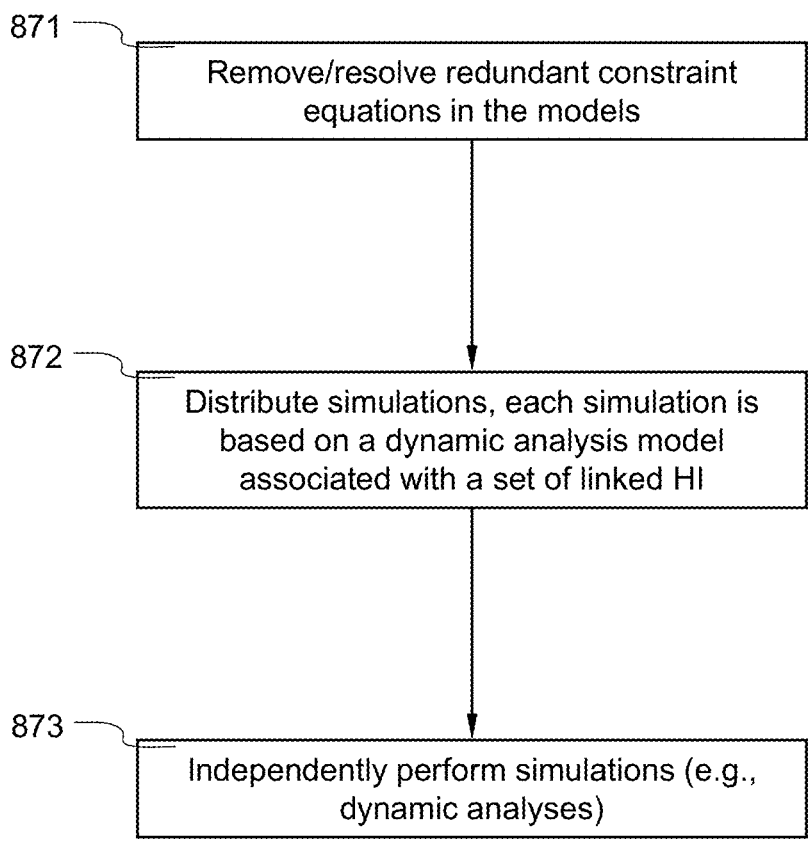

FIG. 8E is a flowchart showing process 822 of conducting simulations of the assembly. At action 871, redundant constraint equations are removed in all of the dynamic analysis model. Next, at action 872, simulations are distributed to different processes (e.g., different computers, CPUs, etc.). Each simulation is based on a corresponding dynamic analysis model associated with a distinct set of linked harmonic indices. The dynamic analysis models are created at action 821 shown in FIG. 8A. Distributing simulations can be based on many factors including, but not necessarily limited to, load balance, round-robin, etc. Then, simulations are independently performed (e.g., in parallel) at action 873. The distributed simulations may be executed in a number of known techniques, for example, multiple computers, multiple processors in one computer, multiple processes within one computing processor, etc. Additionally, the distributed computations may be performed by distributing over both the finite elements and the linked harmonic indices.

Figure 8F:
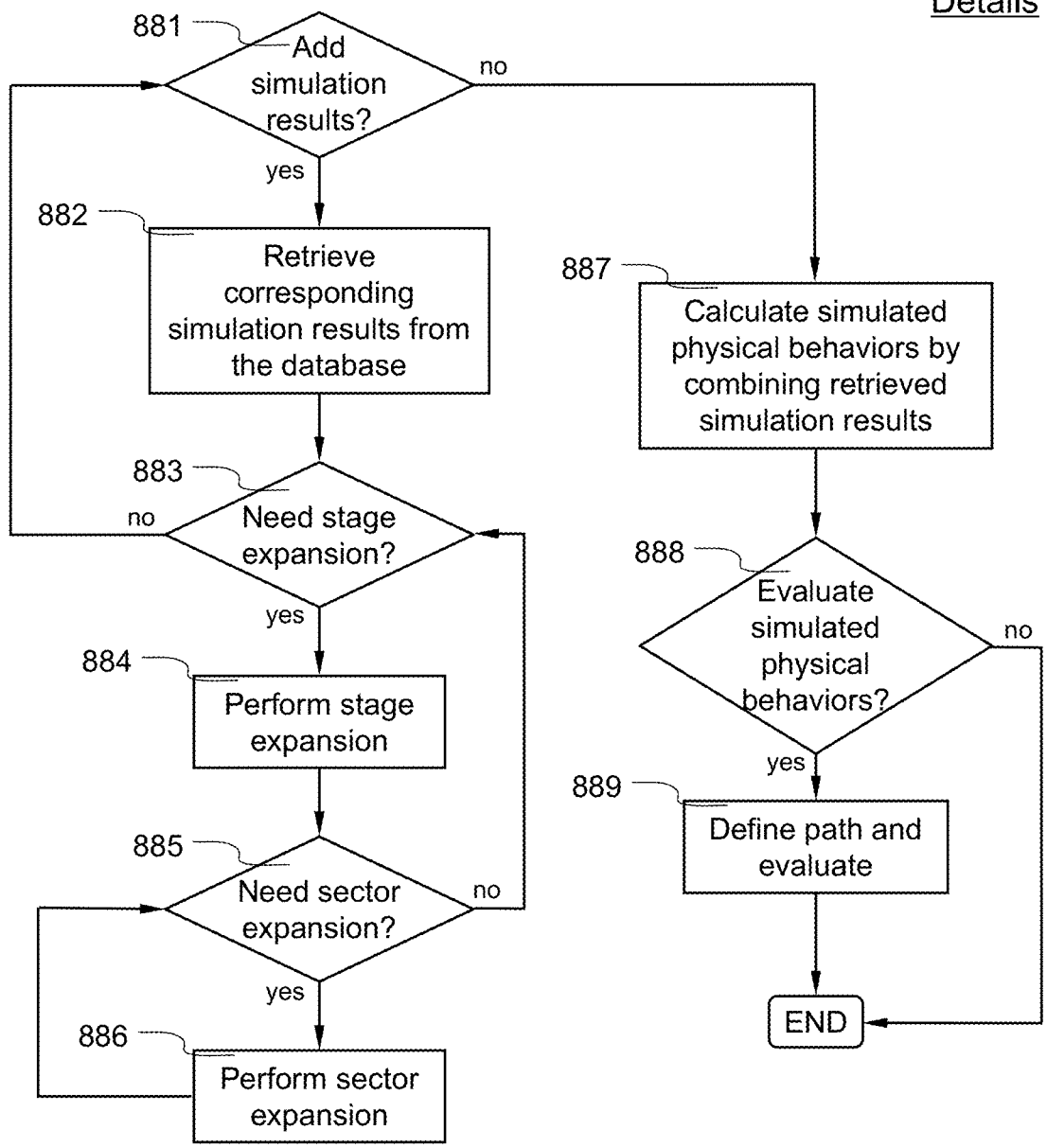

FIG. 8F is a flowchart showing details of postprocessing (i.e., action 824 in FIG. 8A) for simulations of a multistage assembly. At decision 881, it is determined whether a particular set of simulation results (614a-614f in FIG. 6A) needs to be added or included. If 'yes', a corresponding set of simulation results is retrieved from the database 620 at action 882. Then, at decision 883, it is determined if there is a stage to be expanded. If 'yes', at action 884, stage expansion is initiated. Next, at decision 885, it is determined whether sector expansion is needed. If 'yes', sector expansion is performed at action 886. Process repeats the actions for another set of simulation results determined in decision 881.

When there are no more simulation results to add (i.e., decision 881 becomes 'no'), the simulated physical behaviors of the assembly are obtained by summing up all of the retrieved simulation results (e.g., using formula 630 in FIG. 6A) at action 887. In FIG. 6B, fringe plot 631 is for showing simulated physical behaviors without sector expansion while fringe plot 632 is for illustrating simulated physical behaviors with sector expansion.

Figure 7B:
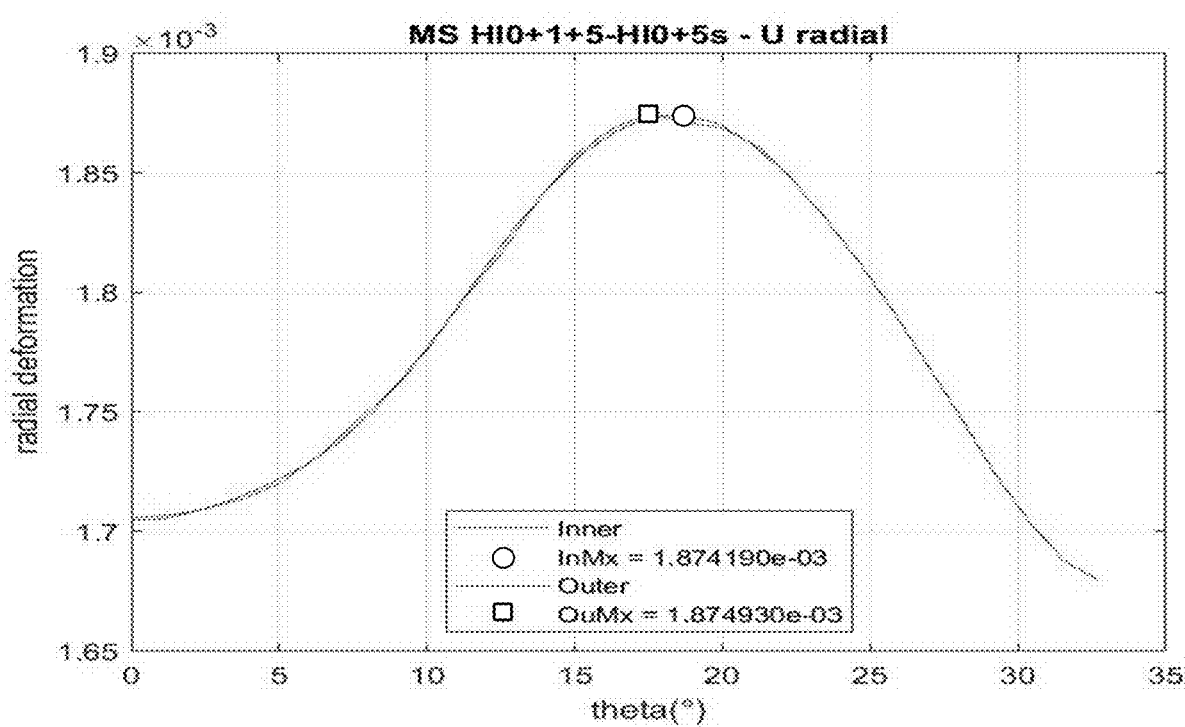

Next, at decision 888, it is determined whether the simulated physical behaviors need to be evaluated. If 'yes', a path (e.g., an interstage boundary) is defined and simulated physical behaviors are compared at either side of the path at action 889. FIGS. 7A-7B show an evaluation example. Action 824 ends thereafter or when decision 888 is 'no'.

The subject matter described herein may be implemented using any suitable processing system with any suitable combination of hardware, software and/or firmware, such as described below with reference to the non-limiting examples shown in FIGS. 9A-9C.

Figure 9A:
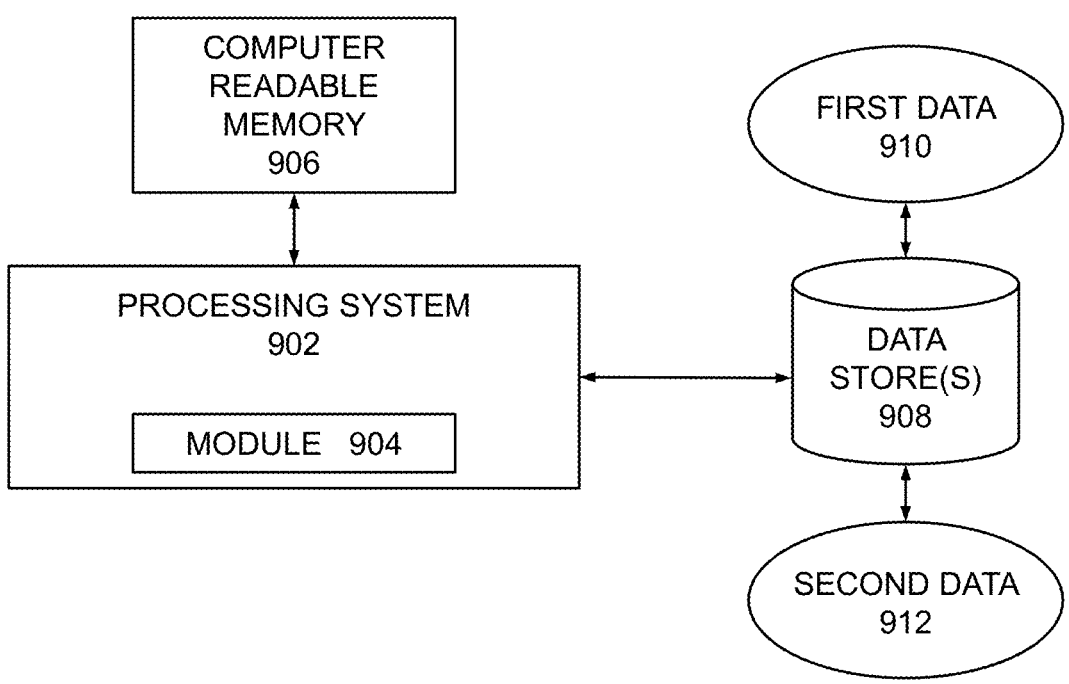
FIG. 9A is a block diagram showing an example system including a standalone computing architecture.

FIG. 9A depicts an example system 900 that includes a standalone computer architecture where a processing system 902 (e.g., one or more computer processors) includes a module 904 (e.g., software module stored in memory) being executed on it. The processing system 902 has access to a non-transitory computer-readable memory 906 in addition to one or more data stores 908. The one or more data stores 908 may contain first data 910 as well as second data 912.

Figure 9B:
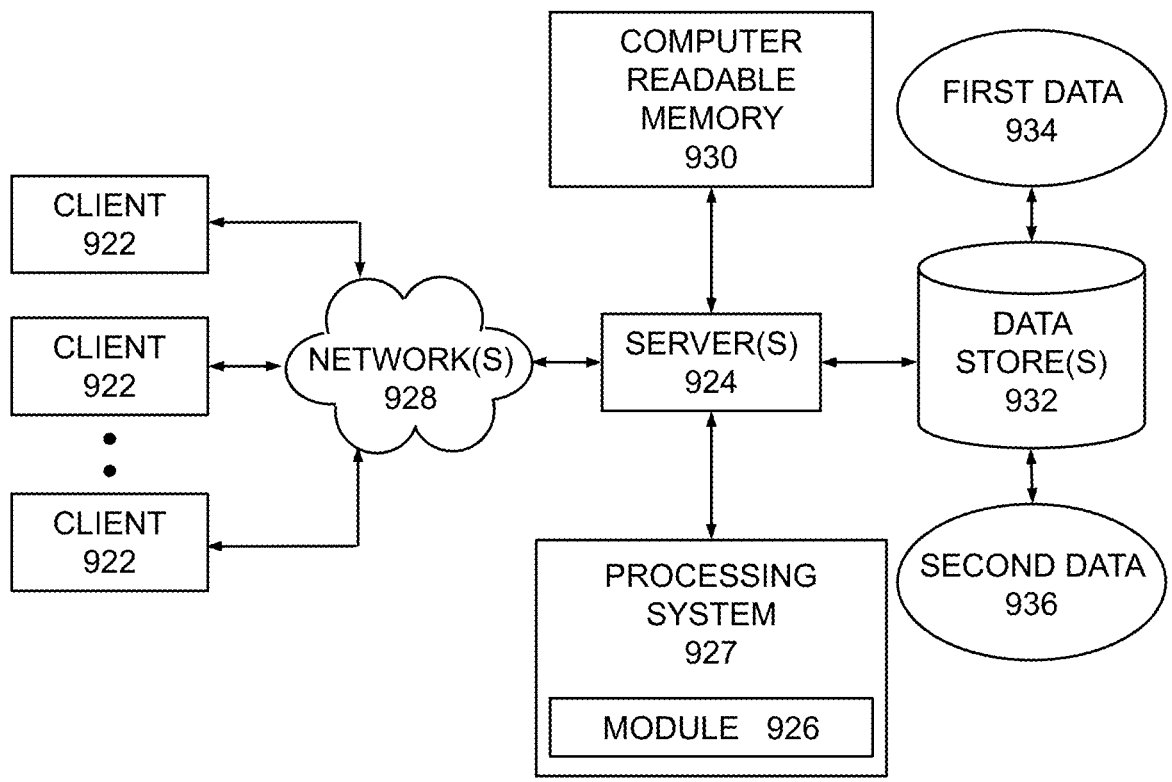
FIG. 9B is a block diagram showing an example system including a client-server computing architecture.

FIG. 9B depicts another example system 920 that includes a client-server architecture. One or more clients 922 (e.g., user personal computer, workstation, etc.) accesses one or more servers 924 executing computer instructions of a module 926 (e.g., software module stored in memory) on a processing system 927 via one or more networks 928. The one or more servers 924 may access a non-transitory computer readable memory 930 as well as one or more data stores 932. The one or more data stores 932 may contain first data 934 as well as second data 936.

Figure 9C:
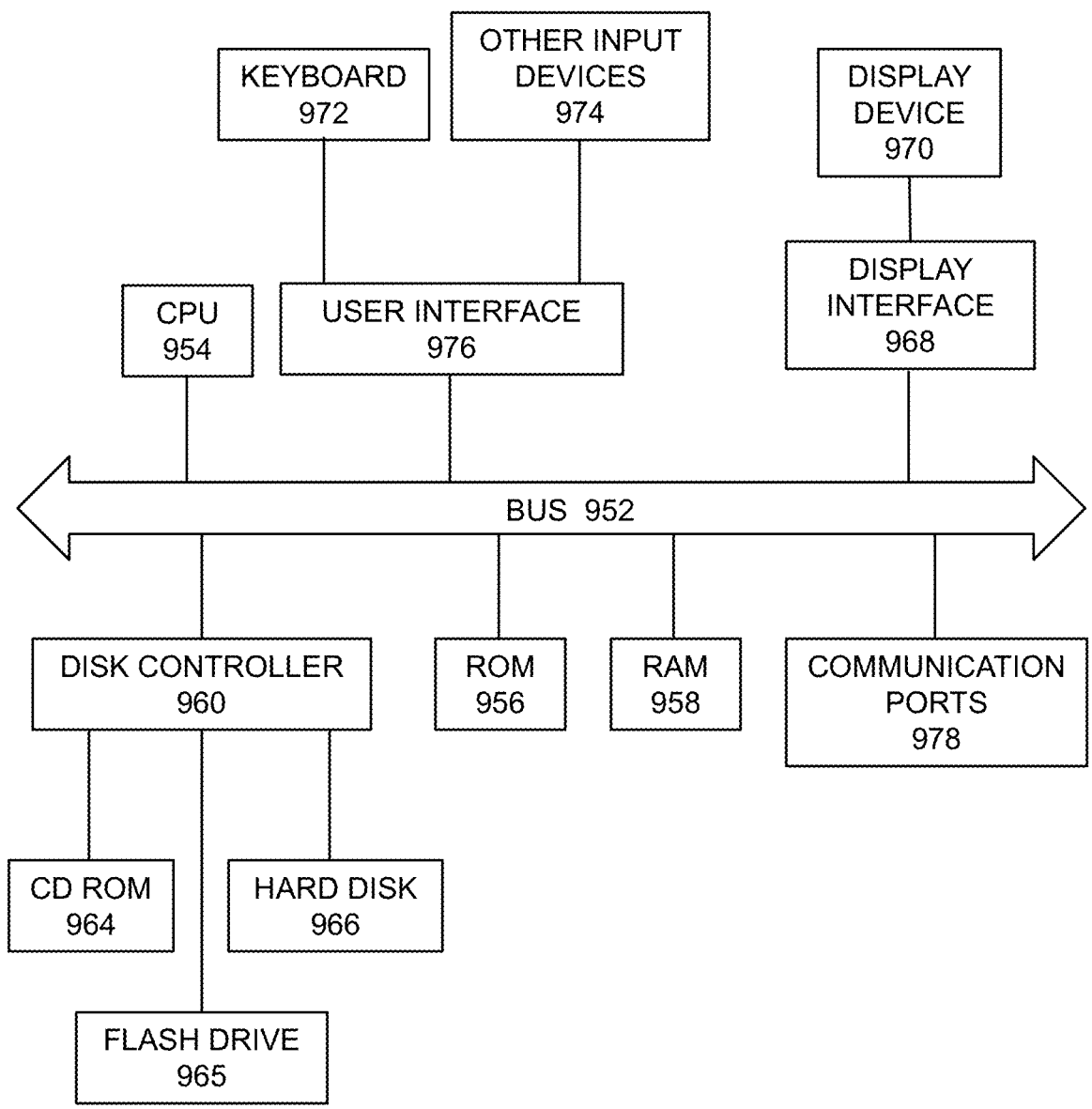
FIG. 9C is a function block diagram showing salient components of an example computing device for implementing the subject matters described herein.

FIG. 9C shows a function block diagram of example hardware for a standalone computer architecture 950, such as the architecture depicted in FIG. 9A, that may be used to contain and/or implement the subject matter described herein. A bus 952 may serve as the information highway interconnecting the other illustrated components of the hardware. A processing system 954 labeled CPU (central processing unit) (e.g., one or more computer processors), may perform calculations and logic operations required to execute a program/software/module. A non-transitory computer-readable storage medium, such as read only memory (ROM) 956 and random access memory (RAM) 958, may be in communication with the processing system 954 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 978.

A disk controller 960 interfaces one or more optional disk drives to the system bus 952. These disk drives may be external or internal flash memory drives 965, external or internal CD-ROM, CD-R, CD-RW or DVD drives 964, or external or internal hard disk drives 966. As indicated previously, these various disk drives and disk controllers are optional devices.

If needed, the processor 954 may access each of the following components: real-time data buffer, conveyors, file input processor, database index shared access memory loader, reference data buffer and data managers. Each component may include a software application stored in one or more of the disk drives connected to the disk controller 960, the ROM 956 and/or the RAM 958.

A display interface 968 may permit information from the bus 952 to be displayed on a display 970 in audio, video, graphic, text, or alphanumeric format.

In addition to the standard computer-type components, the hardware may also include data input devices, such as a keyboard 972, or other input device 974, such as a microphone, remote control, pointer, mouse, touch screen, and/or joystick.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "front", "rear", "high", "low", "outer", and "inner" are intended to provide relative positions/locations for the purposes of description, and are not intended to designate an absolute frame of reference. Further, the order of blocks in process flowcharts or diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas example multistage assemblies have been described and shown with two or three stages, an assembly having more than three stages may be used for achieving the same. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method for providing a digital computer simulation characterizing physical behaviors of multistage cyclic symmetry assemblies comprising:

receiving, by a computer-aided engineering analysis (CAE) software platform, data characterizing an assembly containing a first stage and a second stage, the first stage having a first cyclic symmetry and the second stage having a second cyclic symmetry different from the first cyclic symmetry, the received data including a first mesh and a second mesh respectively representing the first stage and the second stage, the first mesh and the second mesh being mismatched at an interstage boundary;

initializing, by the CAE software platform, a first dynamic analysis model representing the assembly, the first dynamic analysis model including the first mesh coupled with the second mesh based on a first set of constraints associated with a first group of linked harmonic indices;

initializing, by the CAE software platform, a second dynamic analysis model representing the assembly, the second dynamic analysis model including the first mesh coupled with the second mesh based on a second set of constraints associated with a second group of linked harmonic indices distinct from the first group;

simulating, by the CAE software platform, physical behaviors of the assembly based on the first dynamic analysis model and the second dynamic analysis model to generate simulation results, the simulation results generated in parallel using (i) by a first processor, the first dynamic analysis model associated with the first set of constraint equations which are based on the first group of linked harmonic indices and (ii) by a second processor, the second dynamic analysis model associated with the second set of constraint equations which are based on the second group of linked harmonic indices; and calculating, by the CAE software platform, physical behaviors of the assembly using one or more of the simulation results\; and providing, by the CAE software platform, the calculated physical behaviors of the assembly as output.

2. The method of claim 1, wherein the first stage and the second stage are radially stacked.

3. The method of claim 1, wherein the first stage and the second stage are axially stacked.

4. The method of claim 1, wherein each of the first set of constraints and the second set of constraints includes cyclic constraints.

5. The method of claim 1, wherein each of the first set of constraints and the second set of constraints includes interstage constraints.

6. The method of claim 1, wherein the first mesh contains a sector of the first stage.

7. The method of claim 6, wherein the second mesh contains a sector of the second stage.

8. The method of claim 7, wherein the first mesh and the second mesh have different starting circumferential locations in a cyclic symmetry coordinate system.

9. The method of claim 8, wherein the first mesh and the second mesh are aligned at a same starting circumferential location.

10. The method of claim 7, wherein each model is created with a scheme for mapping the first mesh and the second mesh at the interstage boundary, the scheme comprising: rolling out the sector of the first mesh to create a first rollout model.

11. The method of claim 10, the scheme further comprising: rolling out the sector of the second mesh to create a second rollout model.

12. The method of claim 11, further comprising: interpolating nodes or finite elements between the rollout models based on finite element shape functions.

13. The method of claim 1, wherein each respective group of the first group and the second group of linked harmonic indices comprises a fundamental harmonic index for the first stage and the second stage.

14. The method of claim 13, wherein the first group of linked harmonic indices comprises a secondary harmonic index for the first stage and wherein the second group of linked harmonic indices comprises a secondary harmonic index for the second stage.

15. The method of claim 1, further comprising: comparing the physical behaviors along the interstage boundary between the first mesh and the second mesh for validation.

16. The method of claim 1, further comprising:
generating the first dynamic analysis model by:
iteratively creating a stage model from the first mesh each time it is determined that a harmonic index is to be added; and
iteratively radially or axially adding the created stage models to an intermediate model formed by application applying corresponding constraint equations.

17. The method of claim 1, further comprising: performing a prestress analysis of the assembly.

18. The method of claim 17, wherein said performing the prestress analysis comprising:
creating a prestress analysis model that includes a set of constraints corresponding to linked harmonic indices set to zero for the first stage and the second stage; and
updating physical characteristic properties of the assembly based on initial physical behaviors obtained using the prestress analysis model under a preload condition.

19. The method of claim 1, further comprising, before performing simulations of the physical behavior of the assembly, removing a set of redundant constraint equations from the first dynamic analysis model and the second dynamic analysis model.

20. A system for providing a digital computer simulation characterizing physical behaviors of multistage cyclic symmetry assemblies comprising:
a bus;
a memory storing instructions;
one or more processors coupled to the bus and the memory, the one or more processors executing the instructions from the memory to perform a method comprises:
receiving, by a computer-aided engineering analysis (CAE) software platform, data characterizing an assembly containing a first stage and a second stage, the first stage having a first cyclic symmetry and the second stage having a second cyclic symmetry different from the first cyclic symmetry, the received data including a first mesh and a second mesh respectively representing the first stage and the second stage, the first mesh and the second mesh being mismatched at an interstage boundary;
initializing, by the CAE software platform, a first dynamic analysis model representing the assembly, the first dynamic analysis model including the first mesh coupled with the second mesh based on a first set of constraints associated with a first group of linked harmonic indices;
initializing, by the CAE software platform, a second dynamic analysis model representing the assembly, the second dynamic analysis model including the first mesh coupled with the second mesh based on a second set of constraints associated with a second group of linked harmonic indices distinct from the first group;
simulating, by the CAE software platform, physical behavior of the assembly based on the first dynamic analysis model and the second dynamic analysis model to generate simulation results, the simulation results being generated in parallel using (i) by a first processor, the first dynamic analysis model associated with the first set of constraint equations which are based on the first group of linked harmonic indices and (ii) by a second processor, the second dynamic analysis model associated with the second set of constraint equations which are based on the second group of linked harmonic indices; and calculating, by the CAE software platform, physical behaviors of the assembly using one or more of the simulation results; and providing, by the CAE software platform, the calculated physical behaviors of the assembly as output.

21. A non-transitory computer-readable medium storing instructions for commanding one or more processors to perform operations for providing a digital computer simulation characterizing physical behaviors of multistage cyclic symmetry assemblies comprising:

receiving, by a computer-aided engineering analysis (CAE) software platform, data characterizing an assembly containing a first stage and a second stage, the first stage having a first cyclic symmetry and the second stage having a second cyclic symmetry different from the first cyclic symmetry, the received data including a first mesh and a second mesh respectively representing the first stage and the second stage, the first mesh and the second mesh being mismatched at an interstage boundary;

initializing, by the CAE software platform, a first dynamic analysis model representing the assembly, the first dynamic analysis model including the first mesh coupled with the second mesh based on a first set of constraints associated with a first group of linked harmonic indices;

initializing, by the CAE software platform, a second dynamic analysis model representing the assembly, the second dynamic analysis model including the first mesh coupled with the second mesh based on a second set of constraints associated with a second group of linked harmonic indices distinct from the first group;

simulating, by the CAE software platform, physical behavior of the assembly based on the first dynamic analysis model and the second dynamic analysis model to generate simulation results, the first dynamic analysis model being distributed to a first process and the second dynamic analysis model being distributed to a second, different process calculating, by the CAE software platform, physical behaviors of the assembly using one or more of the simulation results;

providing, by the CAE software platform, the calculated physical behaviors of the assembly as output.

* * * * *